United States Patent
Bulusu et al.

(10) Patent No.: US 11,157,265 B2
(45) Date of Patent: Oct. 26, 2021

(54) FIRMWARE UPDATE

(71) Applicant: Microsoft Technology Licensing, LLC, Redmond, WA (US)

(72) Inventors: Mallik Bulusu, Bellevue, WA (US); Ramakoti R. Bhimanadhuni, Redmond, WA (US); Ravi Mysore Shantamurthy, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 493 days.

(21) Appl. No.: 15/838,085

(22) Filed: Dec. 11, 2017

(65) Prior Publication Data

US 2019/0179628 A1    Jun. 13, 2019

(51) Int. Cl.
| | |
|---|---|
| *G06F 8/654* | (2018.01) |
| *G06F 9/4401* | (2018.01) |
| *G06F 21/57* | (2013.01) |
| *G06F 8/65* | (2018.01) |
| *G06F 8/656* | (2018.01) |

(52) U.S. Cl.
CPC ............. *G06F 8/654* (2018.02); *G06F 8/65* (2013.01); *G06F 8/656* (2018.02); *G06F 9/4401* (2013.01); *G06F 21/572* (2013.01); *G06F 9/442* (2013.01); *G06F 2221/033* (2013.01)

(58) Field of Classification Search
CPC ....................................... G06F 8/654
USPC ....................................... 717/168
See application file for complete search history.

(56) References Cited

U.S. PATENT DOCUMENTS

| | | | |
|---|---|---|---|
| 6,581,159 B1 | 6/2003 | Nevis et al. | |
| 6,594,723 B1* | 7/2003 | Chapman | G06F 8/65 711/103 |
| 6,732,267 B1 | 5/2004 | Wu et al. | |
| 6,965,989 B1* | 11/2005 | Strange | G06F 1/24 709/220 |
| 2003/0154471 A1* | 8/2003 | Teachman | G06F 9/4401 717/171 |
| 2004/0044851 A1* | 3/2004 | Dawson | G06F 3/0686 711/154 |
| 2005/0021968 A1* | 1/2005 | Zimmer | G06F 21/572 713/176 |
| 2010/0058306 A1* | 3/2010 | Liles | G06F 21/572 717/168 |

(Continued)

FOREIGN PATENT DOCUMENTS

GB    2436215 A    9/2007

OTHER PUBLICATIONS

"International Search Report and Written Opinion Issued PCT Application No. PCT/US2018/062685", dated Feb. 21, 2019, 11 Pages.

*Primary Examiner* — James D. Rutten
(74) *Attorney, Agent, or Firm* — Mannava & Kang, P.C.

(57) ABSTRACT

Example techniques for updating a firmware, such as BIOS, are disclosed. Upon receiving an update, it is determined whether a secondary non-volatile memory is defined for the firmware. If the secondary non-volatile memory is defined, the update may be written in the secondary non-volatile memory. Further, to apply the update, a warm reboot of the firmware may be performed. The warm reboot causes an OS of the computing system to restart, while preserving data associated with applications running on the computing system.

19 Claims, 4 Drawing Sheets

(56) References Cited

U.S. PATENT DOCUMENTS

| | | | |
|---|---|---|---|
| 2014/0115209 A1* | 4/2014 | Heinrich | G06F 13/4291 710/110 |
| 2015/0143098 A1* | 5/2015 | Arnold | G06F 8/654 713/2 |
| 2015/0186161 A1* | 7/2015 | Cho | G06F 9/44505 713/2 |
| 2016/0202964 A1* | 7/2016 | Butcher | G06F 8/65 717/172 |

* cited by examiner

FIRMWARE UPDATE

BACKGROUND

Computing systems generally include a firmware, such as, for example, Basic Input/Output System (BIOS) firmware, which may be executed by a controller for performing certain specific tasks pertaining to a computing system. For example, the firmware may perform various tasks including initializing and testing of various components of the computing system, power management, loading of an Operating System (OS) of the computing system, etc. In case of a cloud server, once the OS is loaded, Virtual Machines (VMs) may also be initialized and control of the system may be passed on to the OS. One of ordinary skill in the art will appreciate that the term BIOS may be used to denote a legacy BIOS, a Unified Extensible Firmware Interface (UEFI) BIOS or any other code that initializes components in a computing system.

The firmware may have to be updated from time to time to address issues relating to various functions of the computing system, such as, for example, security related fixes. Typically, the update may be performed by writing a patch or corrective code to a firmware image such as, for example, a BIOS image. Because the ability to write to the firmware is a controlled mechanism, the firmware update is typically handled by firmware interfaces. Firmware interfaces may not be under the control of an OS. Rather, they may be under the control of a firmware subsystem. A firmware subsystem typically operates at a layer below the OS in a computing system. Thus, to perform the firmware update, the computing system has to go back to an initial mode, where control is shifted from the OS to the firmware subsystem.

Because control may shift from the OS to the firmware subsystem during a firmware update, the applications that may be currently running on the computing system may be suspended until the firmware update is complete. This interruption to the applications may lead to sub optimal performance of the computing system. This is because firmware updates may take up to several minutes and, in certain cases, to several hours, which may adversely affect system availability. Further, while once the firmware update process is completed and control is handed back to the OS, the applications may be unable to restore to their last state because of data loss, which may occur due to re-initialization of the OS and the associated memory. These and other such problems may lead to suboptimal performance of the computing system.

Accordingly, a firmware update may bring the entire system down and may interrupt the operations of all the running applications till the update is performed. This may be a severe problem in cloud computing systems where multiple instances of virtual machines may be in operation and may share firmware which needs to be updated.

BRIEF DESCRIPTION OF THE DRAWINGS

Features of the present disclosure are illustrated by way of example and not limited to the following Figure(s), in which like numerals indicate like elements.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

Various implementations of the present disclosure describe techniques for firmware update in a computing system. The present subject matter describes a multi-staged firmware update, where firmware patches may be deployed in real-time without affecting the performance of an application or a server node (virtual or real). For the purposes of explanation and not as a limitation, a patch may be understood to be a piece of code to fix a functionality bug or to enhance the existing functionalities of the firmware.

Generally, a computing system, among other things, includes firmware, such as BIOS, which may be responsible for functions, such as, for example, initializing the computing system and the operating system(s) hosted thereon. Similar to application(s) on a computing system, the firmware may also have to be updated to fix functionality related bugs. However, unlike an application update, which is pertinent to a single application, a firmware update may be central to all the applications and the components of the computing system.

Firmware updates are often performed using firmware interfaces, such as a serial peripheral interface (SPI). To perform the update, a patch is written to a non-volatile memory associated with the firmware, such as SPI memory. Because the updates are performed by the firmware interfaces, such as a SPI interface, to the SPI memory, the control from the OS is shifted back to BIOS. This shift in control from the OS to the BIOS may interrupt applications or application threads that may be running on the computing system. Thus, the applications and/or associated virtual machines may experience downtime until the firmware update is complete. Moreover, the computing system may be rebooted to effectuate the firmware update, which may destroy the cached state of the virtual machines. The destruction of the cached state may lead to a loss of information stored in the virtual machines. Owing to this loss of information, the last state (prior to firmware update) of the virtual machines may not be restored, which in turn may impact the functioning of the virtual machines and the applications running thereon.

In an aspect of the present subject matter, multistage firmware update may be performed to minimize the downtime during a firmware update and to maintain the state of virtual machines. During a first stage, the update may be written to a secondary non-volatile memory instead of the SPI memory and in a second or subsequent stage, the update from the secondary non-volatile memory may be copied to primary non-volatile memory to apply the update. The secondary non-volatile memory of a computing system may be understood to be an auxiliary memory, which is provided in addition to the main or primary non-volatile memory of the computing system.

In an example embodiment, the computing system may receive an update pertaining to the BIOS firmware of the computing system. One of ordinary skill in the art will appreciate that the BIOS update may be targeted by a BIOS runtime interface or any proprietary interface that can write to a non-volatile memory. In an example implementation, upon receiving the update, it may be determined whether a secondary non-volatile memory is defined for firmware updates. For instance, a portion of the secondary non-volatile memory may be predefined for firmware updates. Consistent with the present disclosure, such a portion of memory may be referred to as the firmware portion of the secondary non-volatile memory. The secondary non-volatile memory may be understood to be an alternate memory in the computing system in addition to the primary non-volatile memory. Examples of secondary non-volatile memory include an embedded Multi-Media Controller (eMMC), a storage class memory, a Universal Serial Bus (USB), or any other storage media usable to store firmware. One of ordinary skill in the art will appreciate that storage class memory may be a combination of volatile and non-volatile memory devices where the features of both volatile and non-volatile memory may be present.

On determining that the secondary non-volatile memory is defined for firmware updates, a patch for updating the firmware may be written to the secondary non-volatile memory, which may be the firmware portion of the secondary non-volatile memory. In an example embodiment, the OS to write the patch to the secondary non-volatile memory may create a new processor thread. Because the firmware patch may be written to the secondary non-volatile memory by an application thread with the OS in control, as opposed to writing the update to the SPI memory using firmware interfaces, the applications need not be suspended for duration the patch is being written to the secondary non-volatile memory.

Further, to effect the update and at the same to ensure that the state of various virtual machines is maintained, a warm reboot, also referred to as a soft reboot, is performed for the computing system. The warm reboot causes an operating system (OS) of the computing system to restart while preserving data associated with applications running on the computing system. In warm reboot, as against a cold reboot (or hard reboot), the computing system is still powered up and the volatile memory is in a self-refresh mode, where all the data may be saved prior to reboot. For instance, during the warm reboot, the volatile memory may be refreshed at pre-defined clock frequencies to ensure there is no data loss.

In an example embodiment, during the warm reboot, it may be determined if a firmware image, typically an image of the firmware having the update, from the firmware portion is to be shadowed. A firmware image may be understood to be a file having contents of the firmware, and the file may be such that it may be reprogrammed to allow updating of the firmware. Furthermore, shadowing may be understood as copying of the firmware image to from a non-volatile memory, such as read only memory (ROM) or secondary non-volatile memory (as in the present disclosure) to volatile memory, such as random access memory (RAM).

In case it is ascertained that the secondary non-volatile memory includes the firmware image, (i.e., the update to the firmware), the firmware image may be authenticated prior to shadowing to ensure security and integrity of the computing system. Upon successful authentication, the updated firmware may be shadowed from the secondary non-volatile memory. As the update is shadowed during a warm reboot as against traditional cold reboot, the virtual machines and/or applications may easily restore pre-reboot state, i.e., a state prior to the warm reboot.

In an alternative example embodiment, in the event of a cold reboot, the secondary non-volatile memory may be queried to determine if there is a pending firmware update. In case a firmware update is pending to be copied, the update may be copied to a non-volatile memory associated with the firmware, such as, for example, SPI memory, prior to performing the cold reboot. Such a check ensures that a firmware update is not lost in case of a cold reboot or in cases, where the secondary non-volatile memory may be removed.

Thus, the present disclosure provides for efficiently performing firmware update to minimize application/virtual machine downtime, while ensuring sanity of the virtual machines is maintained. Further, the present techniques may be easily integrated with the available resources, thereby making it easy to implement and cost efficient.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

Figure 1:
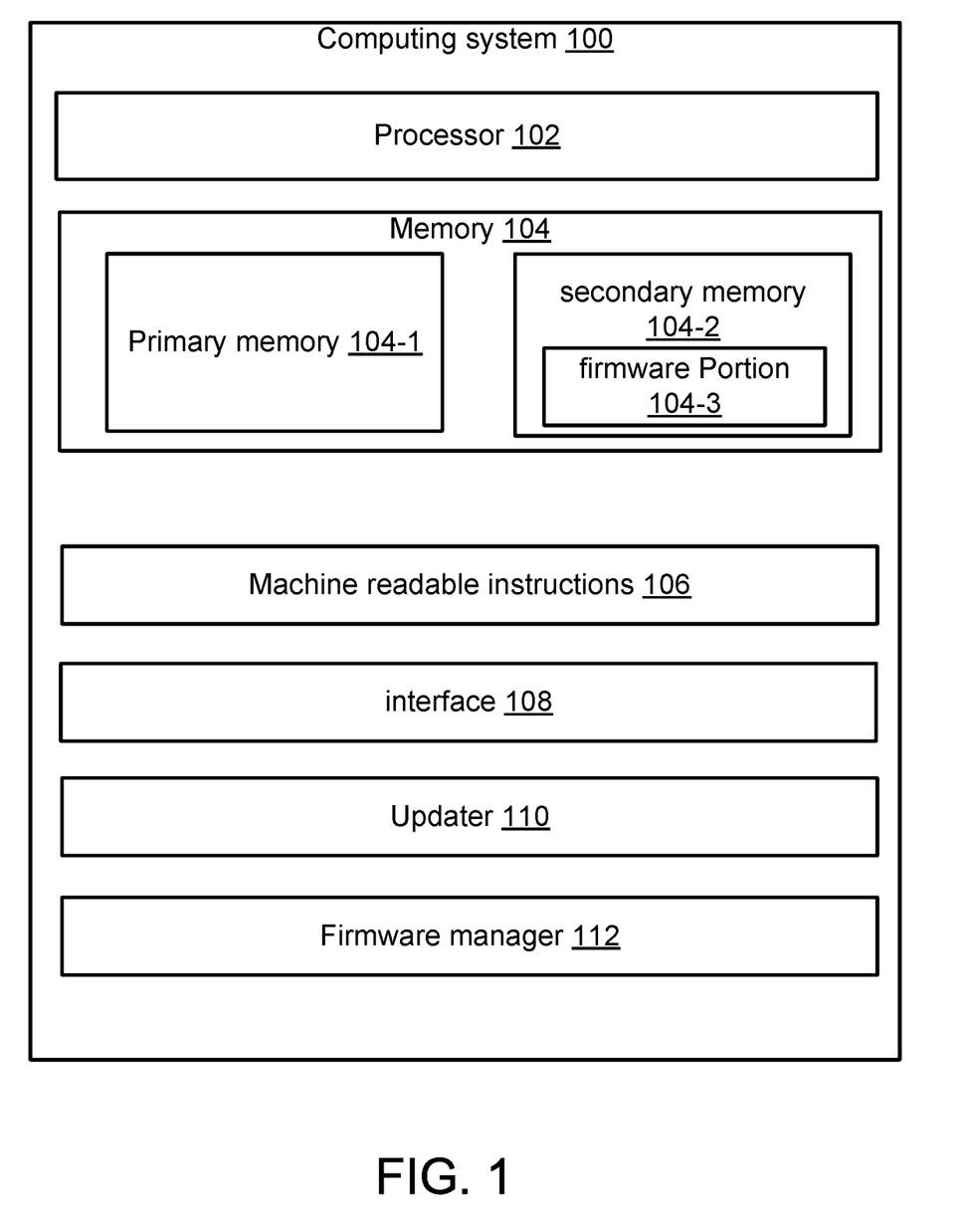
FIG. 1 is a schematic view of a computing system for updating a firmware, in accordance with an example implementation of the present disclosure.

FIG. 1 illustrates a schematic of a computing system 100 for updating a firmware, in accordance with an example implementation of the present subject matter. Although the present subject matter has been explained in considerable detail with respect to Basic Input/Output System (BIOS) firmware, one of ordinary skill in the art will appreciate that principles described herein may be extended to other types of firmware as well. One of o Referring to FIG. 1, the computing system 100 may be a computing device, such as a laptop, a desktop computer, a tablet, a PDA, a server computer, a cloud computer or the like. The computing system 100 may include additional components and one or more of the components described herein may be removed and/or modified without departing from a scope of the computing system 100. For example, the components of the computing system 100 are shown as being on a single computing device or server as an example, and in other examples, the components may be provided on multiple computers or servers. In addition, or in other examples, the apparatus 100 may include multiple processors, a multiple core processor, a plurality of multiple core processors, or the like. The apparatus 100 may also include multiple memories.

The computing system 100 may include a processor 102 and a memory 104 that stores machine readable instructions 106 that the processor 102 may execute. The processor 102, which may be a microprocessor, a micro-controller, an application specific integrated circuit (ASIC), a graphical processing unit, or the like, may perform various processing functions in the computing system 100. The processing functions that the processor 102 performs, and other functions, operations and methods described herein may be embodied in the machine readable instructions 106. In addition to storing the machine readable instructions 106, the memory 104 may store data or functions.

In an aspect of the present disclosure, the memory 104 may include a main or primary non-volatile memory 104-1 and a secondary non-volatile memory 104-2. In an example implementation, the primary non-volatile memory 104-1 may be a low-speed flash device and the secondary non-volatile memory 104-2 may be a high-speed flash device. Examples of the secondary non-volatile memory 104-2 may include, but are not limited to, a Personal Computer Memory Card International Association (PCMCIA) card, a hidden Universal Serial Bus (USB) partition and an embedded Multi-Media Controller (eMMC).

The secondary non-volatile memory 104-2 may be configured to store a firmware image, such as the BIOS image, and associated updates. For example, a portion of the secondary non-volatile memory 104-2, referred to as firmware portion 104-3, may be predefined for use for BIOS related updates. In an example implementation, the BIOS firmware, also referred to as a pre-boot firmware, may be provided with additional capabilities to detect the secondary non-volatile memory 104-2. Once detected, the firmware may be able to create hidden partitions in the secondary non-volatile memory 104-2. In an example embodiment, the BIOS firmware may create a hidden partition(s) using known OS drivers to reserve the portion(s) of the secondary non-volatile memory for BIOS. As described above, such portions may be referred to as the firmware portion or BIOS portion 104-3. The BIOS may publish the created partitions to the OS through interfaces, which the OS can access, such as Advanced Configuration and Power Interface (ACPI). Furthermore, the BIOS portion 104-3 may be a contiguous or non-contiguous block of memory.

Referring back to FIG. 1, the computing system 100 may further include an interface 108 that may include a variety of software and hardware interfaces. The interface 108 may allow the computing system 100 to communicate with other devices, such as computing devices coupled to the computing system 100, and external data repositories, in a network environment. The interface 108 may include a network interface, such as, for example, a Local Area Network (LAN), a wireless 802.11x LAN, a 3G/4G/5G/XG mobile WAN, a WiMax WAN or a LTE WAN.

Furthermore, the computing system 100 may include an updater 110 coupled to the processor 102. The updater 110 may be configured to receive at least one update pertaining to a firmware, such as a basic input/output system (BIOS) firmware of the computing system 100. In an example embodiment, the updater 110 may receive the at least one update from security policies of the computing system 100. Upon receiving the at least one update, the updater 110 may determine whether or not a secondary non-volatile memory 104-2 is defined for firmware updates. For example, a BIOS run-time interface may be queried if the secondary non-volatile memory 104-2 is defined for receiving firmware updates.

As mentioned above, the BIOS portion 104-3 may be pre-defined in the secondary non-volatile memory 104-2. In an example, the updater 100 may query a firmware interface as to whether the secondary non-volatile memory 104-2 is defined for the BIOS firmware. On receiving such a query, the firmware interface may respond with secondary non-volatile memory characteristics if the secondary non-volatile memory is defined for the firmware. The secondary non-volatile memory characteristics aid in identifying the portion(s) of the secondary non-volatile memory 104-2 to which the update is to be written. In an example embodiment, secondary non-volatile memory characteristics may include, for example, data pertaining to Peripheral Component Interconnect (PCI) bus device, offset position, storage type, mailbox region, and other such characteristics.

Upon determining that the secondary non-volatile memory 104-2 is defined for the firmware, the updater 110 may write the at least one update to the BIOS image in the secondary non-volatile memory 104-2, or in particular, to the BIOS portion 104-3. In an example implementation, the updater 110 may perform the write function through an OS driver interface (not shown) of the computing system 100. Thus, where there may be initially n application threads running on the computing system 100, there may now be n+1 threads, where the n+1th thread is for writing the update to the secondary non-volatile memory 104-2. The n+1th may operate in parallel to other n threads and, therefore, a result the update process may not interfere with the operations of the applications currently running on the computing system 100.

The writing of the firmware update to the secondary non-volatile memory 104-2 may comprise the first stage of the multi-stage firmware update performed by the computing system 100. In the second stage or subsequent stage, the firmware image, such as the BIOS image, from the secondary non-volatile memory 104-2 may be copied to effect the update.

Upon writing the BIOS image to the secondary non-volatile memory 104-2, the updater 110 may set a reboot flag to indicate to the BIOS firmware to perform a warm reboot. The BIOS firmware may include a firmware manager 112 to implement the updates. In an example embodiment, a boot block of the BIOS firmware may include the firmware manager 112. The boot block may be hard coded and may include fundamental codes. In accordance with the present disclosure, the firmware manager 112 may determine whether warm or cold reboot is to be performed.

In an example embodiment, on determining the request for the warm reboot, the firmware manager 112 via a Unified Extensible Firmware Interface (UEFI) may initialize the secondary non-volatile memory 104-2. The UEFI may then query the secondary non-volatile memory 104-2 for existence of any firmware updates in the secondary non-volatile memory 104-2. On determining that one or more updates are pending, the firmware manager 112 may subsequently authenticate the updates prior to the updates. The firmware manager 112 may implement authentication techniques such as, for example, signature verification, key matching, and other such techniques. The authentication may aid in determining a valid BIOS image and may thus prevent the computing system 100 from security attacks.

Upon successful authentication of the BIOS image, the firmware manager 112 may shadow the BIOS image, which corresponds to an updated BIOS firmware from the secondary non-volatile memory 104-2 of the computing system 100. To shadow the BIOS image, PCI and BIOS portion 104-3 may be enumerated. Furthermore, a system management mode (SMM) may be initialized to perform the update. For example, a service management interrupt (SMI) may perform the update. In addition, metadata, such as, for example, bus/dev/function, block size, and offset that, describe BIOS portion 104-3 in the secondary non-volatile memory 104-2 are shadowed to system management RAM (SMRAM). Subsequently, a SMI handler is published to return BIOS portion characteristics and the ACPI is published to return secondary BIOS. In addition, the boot target is identified and OS is booted.

However, in case authentication fails and it is determined that the BIOS image is invalid, the firmware manager 112 may shadow the BIOS firmware from the SPI memory (in the primary non-volatile memory 104-1. Subsequently, the boot up process may be performed as described in previous paragraph. In this manner, the warm reboot may aid restoring of system state prior to boot.

In the event that the firmware updater 112 ascertains that a cold reboot is to be performed prior to the cold reboot, the secondary non-volatile memory 104-2 may be queried about the presence of BIOS images. In case it is determined that the secondary non-volatile memory 104-2 includes BIOS images, such BIOS images may be copied to SPI main. This ensures that all the updates are copied in the SPI main because during the cold reboot the secondary non-volatile memory 104-2 may also be initialized. Furthermore, such a check may ensure no update is lost in case the secondary non-volatile memory 104-2 is removed. Upon copying, the BIOS images may be deleted from the secondary non-volatile memory.

Figure 2:
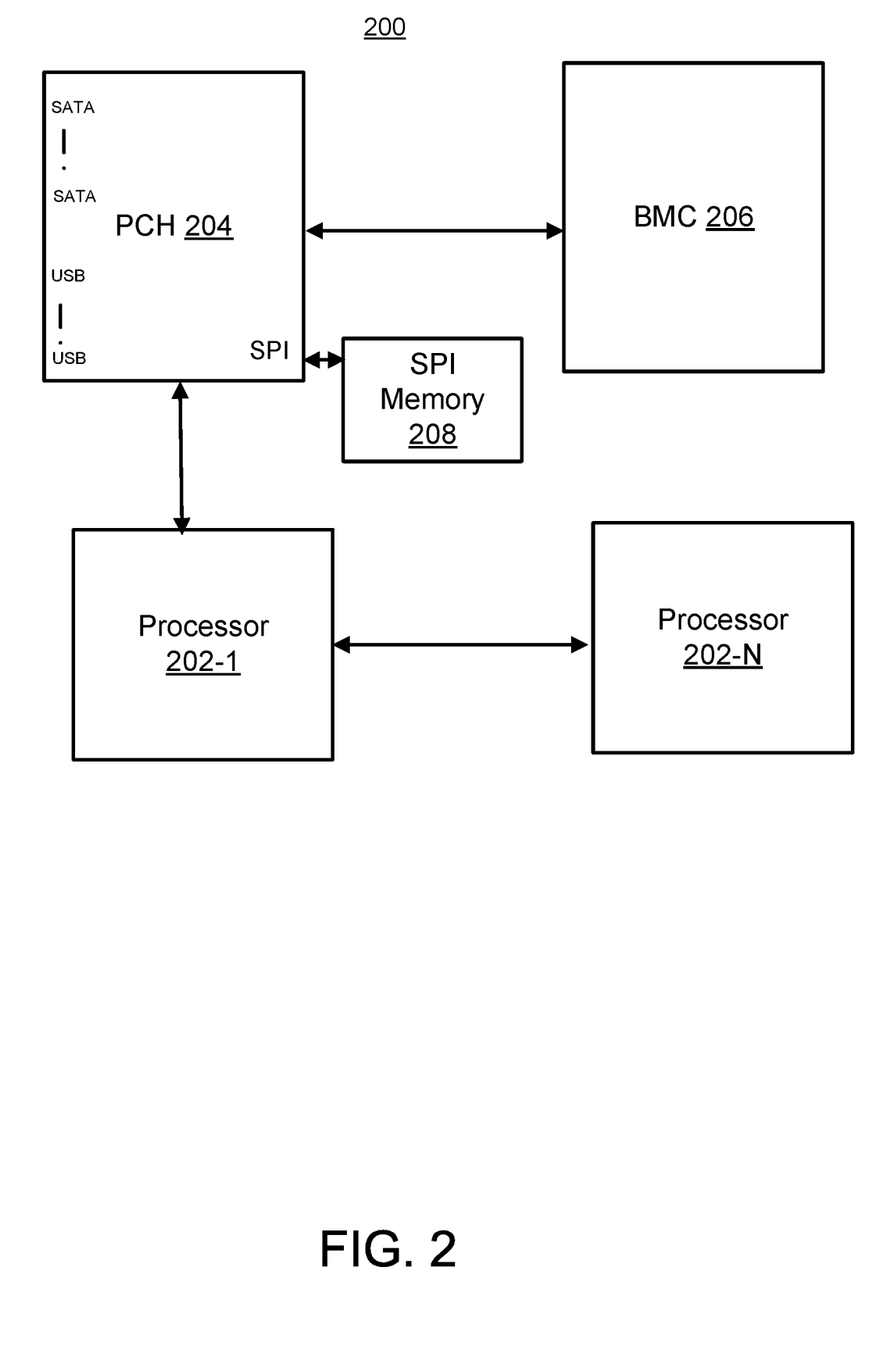
FIG. 2 illustrates a cloud environment implementing firmware update, in accordance with an example implementation of the present disclosure.

FIG. 2 illustrates a cloud server 200 according to an example embodiment. As shown, the cloud server 200 may include multiple processors 202-1 through 202-n. The processor 202 may be similar to the processor 102, described above. The processors 202-1 . . . 202-n, collectively referred to as processor(s) 202 may interact with each other and may share common resources, such as firmware (not shown in figures), a platform controller hub (PCH) 204 and baseboard management controller (BMC) 206. The processors 202 may be of similar or different configurations. Also, workload among the processors 202 may be divided using various load balancing techniques. Each of the processor 202 may also include one or virtual machines. In other examples, the processors 202 may themselves be virtual machines.

One or more processors 202 may be coupled to the PCH 204. The PCH 204 may supplement functions of a processor. Furthermore, the PCH 204 may be in communication with the BMC 206. The BMC 206 may serve as an interface between system management software and platform hardware. The PCH 204 may include interfaces for primary non-volatile memory 104-1 such as the SPI 208, and the secondary non-volatile memory 104-2, such as USBs. The SPI 208 may store UEFI/ME images. For the sake of brevity, only components pertinent to present disclosure have been illustrated. One of ordinary skill in the art will appreciate that the PCH 204, BMC 206, and the processors 202 may include other components and interfaces to interact with other devices.

As described earlier, multiple applications may be running on each of the processors 202. According to an aspect of the present disclosure, when the updater 110 ascertains that the BIOS firmware is to be updated, a new processor thread may be created for writing the firmware update to the secondary portion 104-3 of the secondary non-volatile memory 104-2. The new thread may be created at any of the processors 202. Simultaneously, the other application threads may continue to perform the tasks without being interrupted by the update process. Upon writing the firmware update to the secondary non-volatile memory 104-2, the firmware manager 112 may determine if a warm reboot is to be performed.

In the event of a warm reboot, the secondary non-volatile memory 104-2 may be discovered and it may be ascertained as to whether a BIOS image is to be shadowed. Further, if the BIOS image is to be shadowed, the BIOS image is first authenticated and on being authenticated, the BIOS image from secondary non-volatile memory 104-2 is shadowed, else the BIOS image from SPI 208 may be shadowed. As a result, there may be no system downtime during the warm boot. Thus, the present disclosure provides a provision for firmware update with a warm reboot. In case of a warm reboot, the state of virtual machines may be preserved as the volatile memory is in a self refresh mode, where the content in each cell may be preserved.

In the event of a cold boot, the BIOS image from the secondary non-volatile memory 104-2, if any, may be moved to the SPI main 208 prior to the cold reboot. Thus, in case of the warm boot, the BIOS image from the secondary non-volatile memory 104-2 is shadowed, while in case of the cold reboot, the BIOS image from SPI main 208 is shadowed.

Accordingly, the present disclosure provides an efficient mechanism to deploy firmware updates in a multi-staged manner for high availability of cloud environments. Furthermore, the firmware updates are applied in real time while the system remains available during the updates. Consistent with the present disclosure, the firmware update does not shut the entire system down, and the operations of the running applications are not interrupted.

Figure 3:
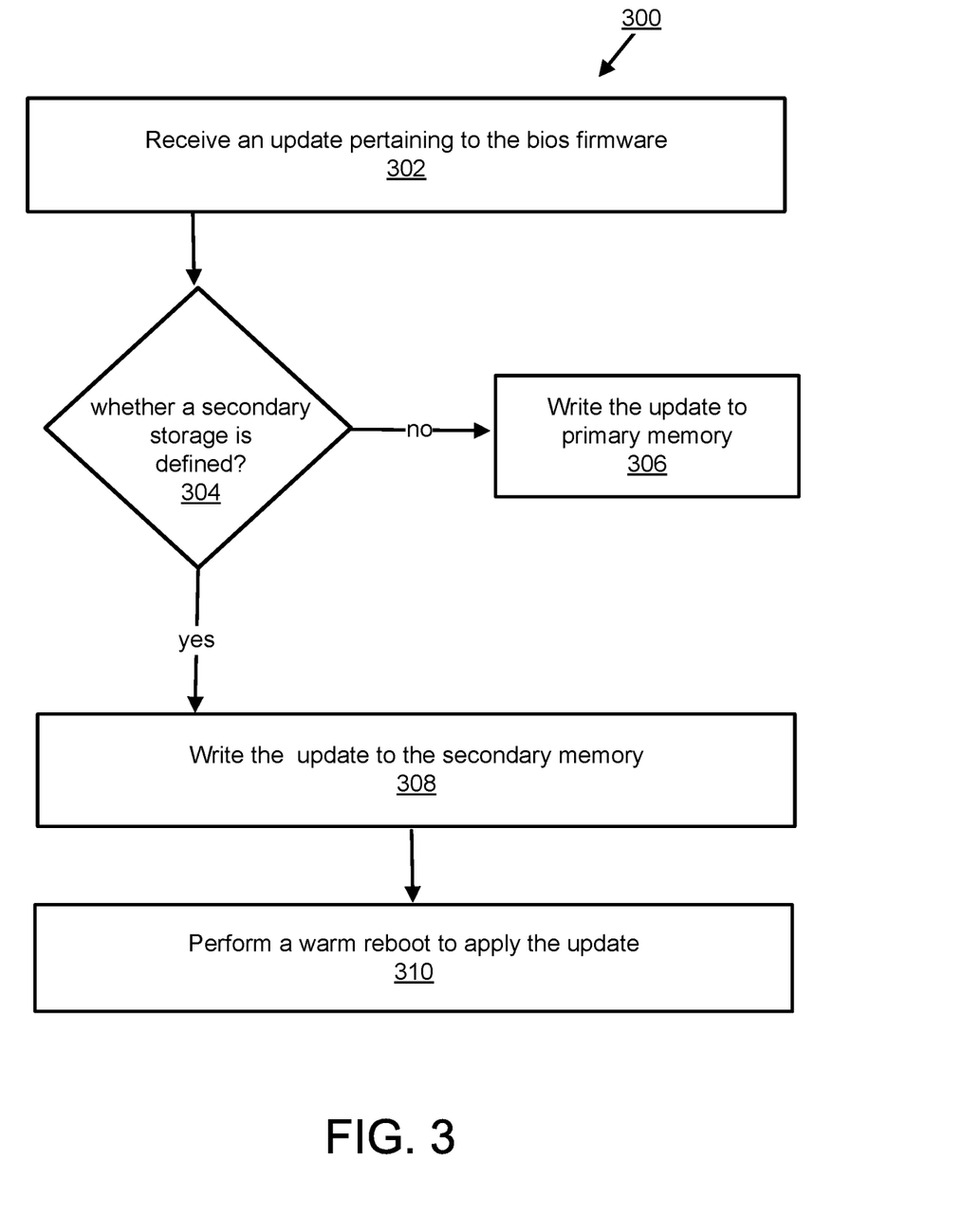
FIG. 3 illustrates a flowchart depicting a method for updating a basic input/output firmware, in accordance with an example implementation of the present disclosure.

Referring to FIG. 3, a flowchart depicting a method 300 for updating a basic input/output (BIOS) firmware in a system, such as the computing system 100 is illustrated, in accordance with an example embodiment of the present disclosure. The processor 102 may execute the method 300 and other methods described herein. For example, the processor 102 as shown in FIG. 1 may execute the machine readable instructions 106 to execute the method 300. Although particular reference is made herein to the processor 102 executing the method 300, another device or multiple devices may execute the method 300 without departing from the scope of the method 300.

At block 302, the method 300 includes receiving, at least one update pertaining to the BIOS firmware of the computing system 100. For example, an updater 110 may receive the one or more updates.

At block 304, the method 300 includes determining whether a secondary non-volatile memory, for instance, partitions in the secondary non-volatile memory 104-2 are defined for the BIOS, upon receiving the at least one update. In an example embodiment, the secondary non-volatile memory 104-2 may be pre-defined in the computing system 100. The secondary non-volatile memory 104-2 may be configured to store any update pertaining to the BIOS firmware of the computing system 100. Examples of the secondary non-volatile memory 104-2 may include, but are not limited to, a PCMCIA card, a hidden USB partition and an eMMC. If the secondary non-volatile memory 104-2 is defined, the method 300 moves to block 308, else the method 300 moves to block 306.

At block 306, the method 300 includes writing the updates in a primary non-volatile memory 104-1 of the computing system 100. For example, when the secondary non-volatile memory 104-2 is not defined for the computing system 100, the firmware manager 112 may directly write the updates pertaining to the BIOS firmware in the primary non-volatile memory 104-1, such as the SRI memory.

At block 308, the method 300 includes writing the at least one update in the secondary non-volatile memory 104-2. In an example, the firmware manager 112 may perform the write function through an operating system (OS) driver interface (not shown) of the computing system 100.

At block 310, the method 300 includes performing a warm reboot of the computing system 100 to apply the at least one update from the secondary non-volatile memory 104-2 to the BIOS firmware. In an example, the warm reboot causes the OS of the computing system 100 to restart while preserving data stored in the memory 104 of the computing system 100.

During the warm reboot, the firmware manager 112 may confirm that the updates available in the secondary non-volatile memory 104-2 are authentic and do not include any malicious code. To do so, the firmware manager 112 may employ various authentication techniques such as, for example, a public-private key pair, to verify the authentication of the updates. Upon successful verification of the authentication of the updates, the firmware manager 112 may shadow an updated BIOS firmware from the secondary non-volatile memory 104-2 of the computing system 100. On the other hand, upon unsuccessful authentication of the updates, the firmware manager 112 may shadow the BIOS firmware from the primary non-volatile memory 104-1, such as the SPI memory of the computing system 100.

Figure 4:
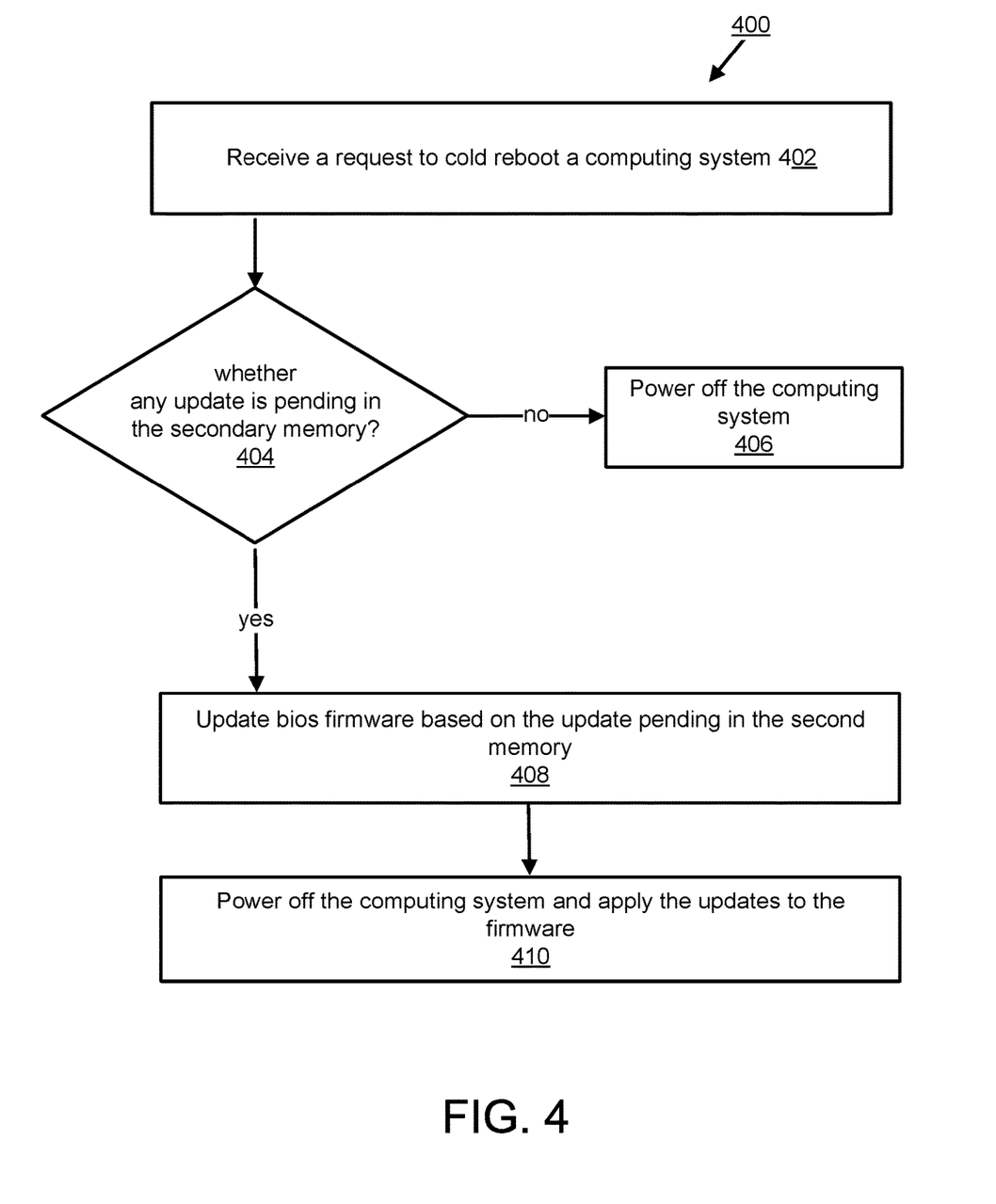
FIG. 4 illustrates a flowchart depicting a method of performing a cold reboot operation, in accordance with an example implementation of the present disclosure.

FIG. 4 illustrates a flowchart depicting a method 400 of performing a cold reboot operation, in accordance with an example embodiment of the present disclosure. The processor 102 may execute the method 400 and other methods described herein. For example, the processor 102 as shown in FIG. 1 may execute the machine readable instructions 106 to execute the method 300. Although particular reference is made herein to the processor 102 executing the method 400, another device or multiple devices may execute the method 400 without departing from the scope of the method 400.

At block 402, the method 400 includes receiving a request to shut down or cold reset/reboot the computing system 100. In an example embodiment, in order to hard-write any updates to the primary non-volatile memory 104-1, the computing system 100 may have to be shut down.

At block 404, the method 400 includes determining whether any BIOS firmware update is pending in the secondary non-volatile memory 104-2. In an example embodiment, the firmware manager 112 may, before cold rebooting, the computing system 100, check whether any update is pending in the secondary non-volatile memory 104-2. For example, it may be determined if there is a BIOS image in the secondary non-volatile memory 104-2 to be copied. If an update is identified as pending in the secondary non-volatile memory 104-2, the method 400 moves to block 408, else the method 400 moves to block 406.

At block 406, the method 400 includes powering off the computing system 100.

At block 408, the method 400 includes based on the determination that an update is pending in the secondary non-volatile memory 104-2, updating the BIOS firmware based on the pending update. Furthermore, on updating the BIOS firmware, the BIOS image may be deleted from the secondary storage.

At block 410, the method 400 includes powering off the computing system 100. During power off or the shut down, the updates are applied to the primary non-volatile memory 104-1 of the computing system 100.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

We claim:

1. A method for performing a firmware update, the method comprising:

receiving, by a firmware interface of a computing system, a Basic Input Output System (BIOS) update of a BIOS firmware of the computing system, wherein the BIOS firmware is stored in a primary memory of the computing system, wherein the firmware interface temporarily stores the BIOS update;

in response to receiving the BIOS update by the firmware interface, determining, by a processor of the computing system, whether a secondary memory of the computing system is defined for storing the BIOS update for the primary memory of the computing system, the secondary memory being an auxiliary memory physically separate from the firmware interface and the primary memory of the computing system;

in response to a determination that the secondary memory is not defined for storing the BIOS firmware updates for the primary memory, writing, by the processor, the BIOS update directly from the firmware interface into the primary memory;

in response to a determination that the secondary memory is defined for storing the BIOS update for the primary memory, writing, by the processor, the BIOS update from the firmware interface into the secondary memory without interrupting operations of applications that are currently running on the computing system and setting a reboot flag to indicate to the processor to perform a warm reboot of the computing system; and performing, by the processor, the warm reboot of the computing system, including applying, by the processor, the BIOS update stored in the secondary memory to the BIOS firmware in the primary memory, without shutting down the computing system and without interrupting the operations of the applications that are currently running on the computing system, wherein the warm reboot of the computing system is a process to restart an operating system (OS) of the computing system without shutting down the computing system while preserving data associated with the applications currently running on the computing system.

2. The method as claimed in claim 1, further comprising creating partitions in the secondary memory to define a portion to store the BIOS update.

3. The method as claimed in claim 1, wherein performing the warm reboot of the computing system comprises:

authenticating a BIOS firmware image corresponding to the BIOS update; and shadowing the BIOS firmware image from the secondary non volatile memory to apply the BIOS update when the BIOS firmware image is authenticated.

4. The method as claimed in claim 3, wherein the method further comprises shadowing another BIOS firmware image from the primary memory when the BIOS firmware image in the secondary memory is not authenticated.

5. The method as claimed in claim 1, further comprising receiving a request for cold reboot of the computing system, wherein the cold reboot comprises:

determining whether any firmware update is pending in the secondary memory;

updating the BIOS firmware in the primary memory in response to a determination that a firmware update is pending in the secondary memory; and upon updating, powering off the computing system.

6. The method as claimed in claim 1, wherein writing the BIOS update from the firmware interface into the secondary memory is performed through an OS driver interface.

7. The method as claimed in claim 1, wherein determining whether the secondary memory is defined for storing the BIOS firmware updates for the primary memory comprises:

receiving, by the firmware interface, secondary memory characteristics for the firmware interface to identify a portion of the secondary memory to which the BIOS update is to be written.

8. A computing system comprising:
a processor;
a primary non-volatile memory storing a Basic Input Output System (BIOS) firmware and a secondary non-volatile memory configured to store BIOS updates for the primary non-volatile memory, wherein the secondary non-volatile memory is physically separate from the primary non-volatile memory;
a firmware interface to receive a BIOS update from an external source and temporarily store the BIOS update; and
a storage storing instructions that are executable to cause the processor to:
in response to receipt of the BIOS update by the firmware interface, determine whether the secondary non-volatile memory is defined for storing the BIOS update for the primary non-volatile memory;
in response to a determination that the secondary non-volatile memory is not defined for storing the BIOS update for the primary non-volatile memory, write the BIOS update directly from the firmware interface into the primary non-volatile memory;
in response to a determination that the secondary non-volatile memory is defined for storing the BIOS update for the primary non-volatile memory, write the BIOS update from the firmware interface into the secondary non-volatile memory without interrupting operations of applications that are currently running on the computing system and set a reboot flag to indicate to the processor to perform a warm reboot of the computing system; and
perform the warm reboot of the computing system, including applying the BIOS update stored in the secondary non-volatile memory to the BIOS firmware in the primary non-volatile memory, without shutting down the computing system and without interrupting the operations of the applications that are currently running on the computing system, wherein the warm reboot is a process to restart an operating system (OS) of the computing system without shutting down the computing system while preserving data associated with the applications currently running on the computing system.

9. The computing system as claimed in claim 8, wherein the secondary non-volatile memory includes a partition to define a portion for receiving the BIOS update.

10. The computing system as claimed in claim 8, wherein, prior to applying the BIOS update, the instructions cause the processor to:
authenticate a BIOS firmware image corresponding to the BIOS update in the secondary non-volatile memory; and
shadow the BIOS firmware image from the secondary non-volatile memory to apply the BIOS update when the BIOS firmware image is authenticated.

11. The computing system as claimed in claim 10, wherein the instructions cause the processor to shadow another BIOS firmware image from the primary non-volatile memory when the BIOS firmware image in the secondary non-volatile memory is not authenticated.

12. The computing system as claimed in claim 8, wherein the instructions cause the processor to perform a cold reboot of the computing system upon receiving a cold reboot request, and wherein to perform the cold reboot, the processor is to:
determine whether any firmware update is pending in the secondary non-volatile memory;
in response to a determination that a firmware update is pending in the secondary non-volatile memory, update the BIOS firmware in the primary non-volatile memory in accordance with the firmware update; and
upon updating, power off the computing system.

13. The computing system as claimed in claim 8, wherein the instructions cause the processor to write the BIOS update through an OS driver interface.

14. The computing system as claimed in claim 8, wherein to determine whether the secondary non-volatile memory is defined for storing the BIOS update for the primary non-volatile memory, the processor is to:
receive secondary non-volatile memory characteristics to identify a portion of the secondary non-volatile memory to which the BIOS update is to be written.

15. A non-transitory computer readable medium storing machine readable instructions that are executable by a processor to:
receive, via a firmware interface of a computing system, a Basic Input Output System (BIOS) update of a BIOS firmware of the computing system, wherein the BIOS firmware is stored in a primary memory of the computing system;
temporarily store the BIOS update in the firmware interface of the computing system;
in response to receiving the BIOS update, determine, via the firmware interface, whether a secondary memory of the computing system is defined for storing the BIOS update for the primary memory of the computing system, wherein the secondary memory is physically separate from the primary memory;
in response to a determination that the secondary memory is not defined for storing the BIOS update for the primary memory, write the BIOS update directly from the firmware interface into the primary memory;
in response to a determination that the secondary memory is defined for storing the BIOS update for the primary memory, write the BIOS update from the firmware interface into the secondary memory without interrupting operations of applications that are currently running on the computing system and set a reboot flag to indicate to the processor to perform a warm reboot of the computing system; and
perform the warm reboot of the computing system, including applying the BIOS update stored in the secondary memory to the BIOS firmware in the primary memory, without shutting down the computing system and without interrupting the operations of the applications that are currently running on the computing system, wherein the warm reboot is a process to restart an operating system (OS) of the computing system without shutting down the computing system while preserving data associated with the applications currently running on the computing system.

16. The non-transitory computer readable medium as claimed in claim 15, wherein, prior to applying the BIOS update, the instructions cause the processor to:
authenticate a BIOS firmware image corresponding to the BIOS update in the secondary memory; and
shadow the BIOS firmware image from the secondary memory to apply the BIOS update when the BIOS firmware image is authenticated.

17. The non-transitory computer readable medium as claimed in claim 16, wherein the instructions cause the processor to shadow another BIOS firmware image from the primary memory when the BIOS firmware image in the secondary memory is not authenticated.

18. The non-transitory computer readable medium as claimed in claim 15, wherein, upon receiving a cold reboot request, the instructions cause the processor to perform a cold reboot, including causing the processor to:
- determine whether any firmware update is pending in the secondary memory;
- in response to a determination that a firmware update is pending in the secondary memory, update the BIOS firmware in the primary memory based on the pending firmware update; and
- upon updating, power off the computing system.

19. The non-transitory computer readable medium as claimed in claim 15, wherein the instructions that cause the processor to determine whether the secondary memory is defined for storing the BIOS update for the primary memory include instructions that cause the processor to:
- receive secondary memory characteristics to identify a portion of the secondary memory to which the BIOS update is to be written.

* * * * *